United States Patent [19]

Schmid

[11] Patent Number: 5,055,249
[45] Date of Patent: Oct. 8, 1991

[54] METHOD FOR THE MANUFACTURE OF CROSSLINKED POLYAMIDE ARTICLES

[75] Inventor: Eduard Schmid, Bonaduz, Switzerland

[73] Assignee: EMS-Inventa AG, Switzerland

[21] Appl. No.: 361,262

[22] Filed: Jun. 5, 1989

[30] Foreign Application Priority Data

Jun. 7, 1988 [DE] Fed. Rep. of Germany ....... 3819428

[51] Int. Cl.$^5$ ...................... B29C 35/04; B29C 35/06; C08G 69/48; C08L 77/00
[52] U.S. Cl. .............................. 264/236; 264/211.24; 264/331.11; 264/331.19; 525/181; 525/183; 525/184; 525/431
[58] Field of Search .............. 264/211, 211.13, 211.24, 264/236, 237, 328.1, 328.17, 328.18, 331.11, 331.19, 347; 525/181, 183, 184, 431

[56] References Cited

U.S. PATENT DOCUMENTS

| | | | |
|---|---|---|---|
| 4,647,630 | 3/1987 | Schmid et al. | 525/431 |
| 4,783,511 | 11/1988 | Schmid | 525/431 |
| 4,857,250 | 8/1989 | Gale et al. | 264/236 X |

FOREIGN PATENT DOCUMENTS

| | | | |
|---|---|---|---|
| 53-14750 | 2/1978 | Japan | 264/331.11 |
| 60-233132 | 11/1985 | Japan | 525/431 |
| 2131037 | 6/1984 | United Kingdom | 525/431 |

*Primary Examiner*—Leo B. Tentoni
*Attorney, Agent, or Firm*—Jordan B. Bierman

[57] ABSTRACT

A process for the preparation of crosslinked shapes from a polymer which consists of reacting a starting polyamide with a particular silane. The polyamide should have at least 30% by weight of branched polymer chains, but these may be furnished by adding branching agents to the monomers before or during polymerization. After the reaction with silane has taken place, the polymer is molded or otherwise formed into desired shapes and brought into contact with water. This causes three dimensional crosslinking of the polymer and provides improved mechanical and fire resistant properties to the finished product. Moreover, the finished product may be formed by the usual methods of shaping without any particular treatment being required.

47 Claims, 5 Drawing Sheets

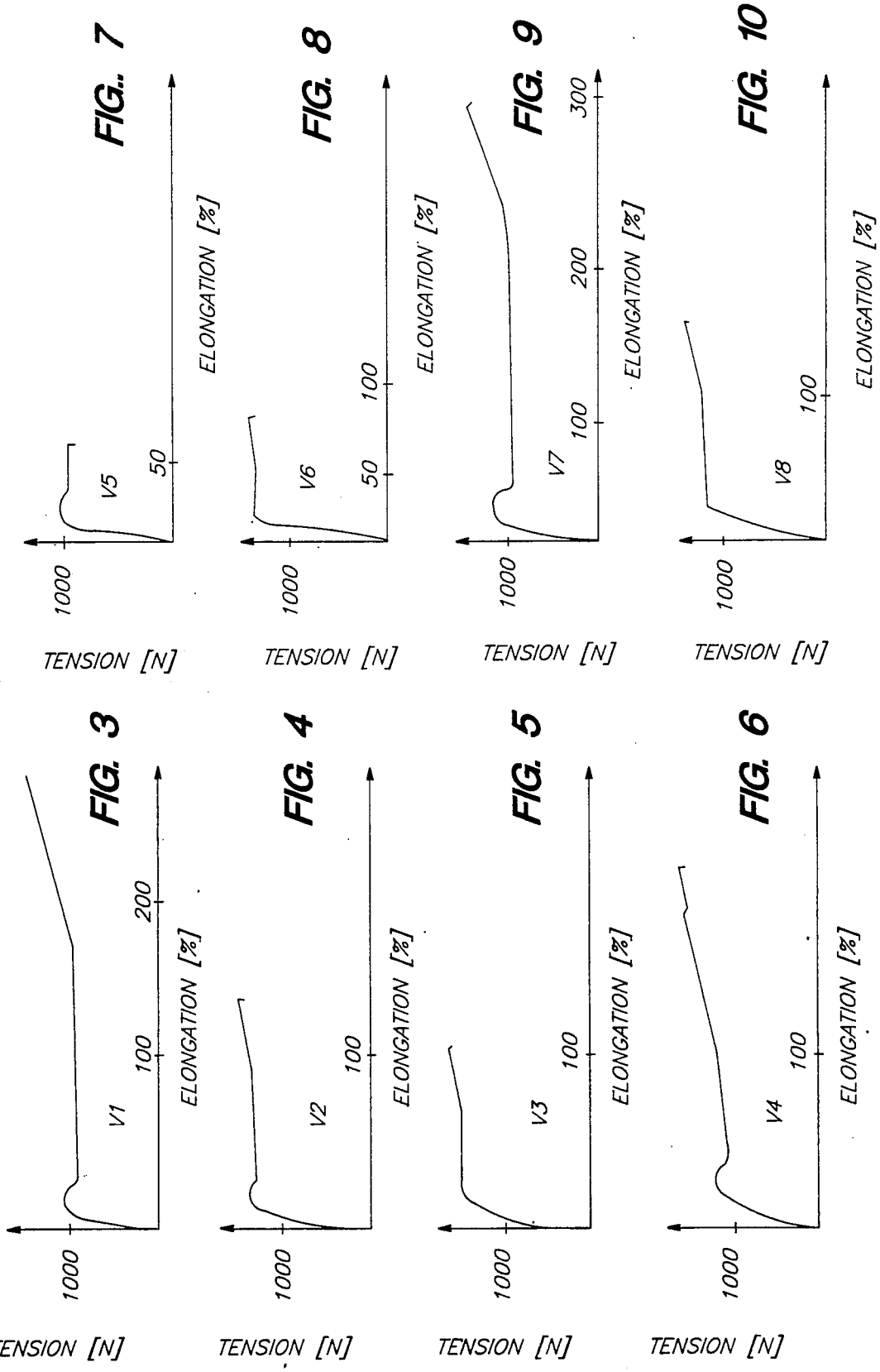

METHOD FOR THE MANUFACTURE OF CROSSLINKED POLYAMIDE ARTICLES

This application claims the benefit of the priority of German Application 38 19 428.7, filed June 7, 1988.

The present invention relates to a process for the production of crosslinked polyamide shaped articles.

BACKGROUND OF THE INVENTION

The reaction of linear, unbranched polyamides composed of amino acids, lactams, diamine-dicarboxylic acid salts, polyamides which also contain aromatic monomers, elastomeric polyamides with polyether blocks, and mixtures thereof with reactive silanes to obtain useful articles having an altered property profile, is set forth in U.S. Pat. No. 4,647,630.

U.S. Pat. No. 4,783,511 describes a specific process for the production of such polyamide shaped articles wherein masterbatches are used as carriers for the reactive silane to allow the difficult metering and homogeneous incorporation of the silanes into the polyamides. In particular, the process is directed to injection molding.

Polyamides, made from lactams and/or ω-amino-carboxylic acids, which are branched several times, and components having a branching effect, are described in DE-OS 38 19 427.9. These polyamides consist of chains which are branched several times, are branched singly and are linear. The terminal groups thereof can be predetermined.

DESCRIPTION OF THE INVENTION

As the performance profiles of these new types of polyamides do not yet satisfy all the requirements, especially for construction elements, tools, wear-resistant shaped articles such as cable sheaths, or materials with very high creep resistance and toughness, it is among the objects of the invention to provide polyamide shaped articles with more highly improved mechanical properties.

In practicing one form of the invention, polyamides containing at least 30% by weight of branched polymer chains are reacted in the melt with a silane of the formula

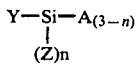

$$Y-\underset{(Z)_n}{\overset{|}{Si}}-A_{(3-n)} \qquad I.$$

wherein n is 0, 1 or 2; Z is an inert organic radical; A is a radical which can be hydrolyzed in the presence of moisture; and Y is a divalent organic radical containing a functional group which reacts with amino groups; carboxyl groups, or amide groups, to form a stable chemical bond. Preferred amino groups are —NHR or —NH$_2$, wherein R is an alkyl, aryl, cyclohexyl, or aralkyl group, all having a maximum of 12 carbon atoms. The reaction products are shaped and the resultant articles are then brought into contact with water to form the finished products.

These products possess surprisingly improved properties. Their yield resistance is increased; creep under load, in particular even at elevated temperature, is sharply reduced; dripping on contact with an open flame is markedly delayed; and stability to heat and hydrolysis is clearly improved. In addition, only their uncrosslinked contents remain soluble. If the temperature rises above the usual melting point of polyamide, they retain their shape.

A further advantage of the process according to the invention is that the polyamides from which the articles are produced can be formed simply by the usual thermoplastic shaping processes. The crosslinked structure, which causes the loss of fusibility or solubility, is created only after formation of intermolecular —Si—O—Si bridges from the hydrolyzable —Si—O—R groups due to the action of water or moisture.

The properties of the articles produced from the polyamide molding compositions of the Invention can be predetermined from the concentration (number) of previously formed polyamide branch points, the type of silane functional groups, and the type and concentration of the functional groups of the polyamides which are important for the reaction with the silane. Polyamides which are particularly suitable for carrying out the process according to the invention include singly branched polyamides, as well as polyamides according to DE-OS 38 19 427.9.

Consequently, according to the invention, the polyamides used as starting materials are preferably those which are produced by hydrolytic polymerization from lactams and/or amino carboxylic acids containing six to twelve carbon atoms or mixtures thereof. Preferably, these are 12-aminolauric acid, caprolactam, enantholactam, laurolactam, p-aminomethylbenzoic acid, or mixtures thereof.

As has been previously stated, polyamides having at least 30% by weight of branched chains are used in the present process. The branching can be carried out during polymerization by the addition of special components in a predetermined molar ratio to the basic monomer. Trimesic acid and nitrilotriethane amine are suitable as the branching component. If polymer chains which are branched several times are required, then components with more than two carboxyl and/or amino groups are combined in the manner described. DE-OS 38 19 427.9 teaches the production of polyamides having a predetermined content of singly branched, multiply branched, and linear chains. It also describes the adjustment of molecular weight, as well as the type and concentration of terminal groups as desired. A typical terminal group is —NHR.

Components having a branching action are essentially added to the basic monomer in the following composition:

(1) 5–150 μmol/g of polymer of an at least trifunctional monomer (amine or carboxylic acid), (2) 2–100 μmol/g of polymer of an at least bifunctional monomer (carboxylic acid or amine). However, if (1) is amine, (2) must be carboxylic acid, and if (1) is carboxylic acid, (2) must be amine, and optionally (3) 5–450 μmol/g of polymer of a monomer which acts monofunctionally during conventional polycondensation, wherein (1) can also contain a bifunctional monomer.

A singly branched chain content, or a linear chain content, can be achieved with small amounts of component (3) if its condensation-active group is the same as (1). If (3) has the same functionality (chemical equivalence) as (2) and, if (3) carries a sterically hindered —NHR group in addition to the condensation-active groups, it forms chains with terminal —NHR groups. It can be determined directly from the molar ratio of (1) to (2) and the functionality of (1) and (2) in which concentration (3) must be added to obtain as many terminal —NHR groups as possible. When crosslinking is performed with epoxide silane, desirable properties are obtained, especially if the polyamide used has a numerical content of —NHR groups of at least 60%, preferably 70 to 95%, based on all the terminal amino groups.

When carrying out the process according to the invention, the silanes corresponding to Formula I are used with the polyamides, preferably in an equivalent ratio of silanes to the sum of —NHR and —NH$_2$ terminal groups of 0.3–1.2.

The term "inert organic radical Z" should be interpreted as a radical which is inert under the reaction conditions and contains, preferably, one to twelve carbon atoms. Such organic radicals include alkyl radicals with one to twelve carbon atoms, aryl radicals with six to ten carbon atoms, and cycloalkyl radicals.

For radical Y, it is preferable to use, as the functional groups, epoxy, isocyanate, acid anhydride, amino or carboxylic acid esters of aromatic alcohols, which alcohols have two to fifteen carbon atoms. The divalent organic radical preferably consists of straight or branched chains with one to six carbon atoms and can also contain ether oxygen.

The hydrolyzable radical A preferably consists of the group -OR, wherein R represents a (cyclo) (ar) aliphatic radical or an aliphatic radical containing ether oxygen atoms. The radicals advantageously have one to four carbon atoms in their aliphatic portions. Most preferred are methyl, ethyl, and/or 2-methoxyethyl groups.

The terminal amino groups are particularly preferred owing to the wide variety of possible reactions which are possible. For example, they will react with epoxide, isocyanate, acid anhydride, and esters of carboxylic acids with phenols. If the rapidly occurring addition reaction of epoxide is preferred for the reaction with silane, then a chain end formed by —NHR is particularly suitable.

It is essential for the silane to be distributed as well as possible in the polyamide melt so that the coupling reaction with the polyamide (e.g. the —NHR group) can take place as completely as possible. The incorporation of the silane and its reaction with the polyamide must take place in the absence of moisture so that the crosslinking reaction to form —Si—O—Si by hydrolysis does not take place before shaping.

Two methods of adding silane have proven particularly useful for carrying out the process according to the invention. In a continuous extrusion process (e.g. to produce a tube, profile, cable, or optical waveguide sheath), the continuous injection of a predetermined proportion by weight of the silane directly into the polymer melt is suitable. For best results, the extruder must be constructed so as to ensure good distribution of the silane in the melt and a flow of polymer melt which is as uniform as possible. Dead points which have little or no flow of melt lead to defects through the formation of crosslinked material during the continuous operation.

The masterbatch process described in U.S. Pat. No. 4,783,511 has proven particularly useful. The process is based on the use of polyamide-compatible polymer components which, at room temperature or at a temperature at which no secondary reactions take place, absorb quantities of silane large enough so that masterbatches which are suitable for the process can be produced from them. Suitable masterbatch carriers include microporous polyamides, for example polyamide 12; and polymers which possess a series of double bonds, for example polybutadienes such as the di- or tri-block polymers designated as SB or as SBS; and crosslinked butadiene-containing polymers, for example of the core/shell type.

Copolyolefins are also suitable, in particular copolyolefins having a low degree of crystallinity. These include ethylene/propylene or ethylene/α-olefin copolyolefins; suitable α-olefins include butene, hexene, and octene. Ethylene/acrylic acid ester copolymers are also suitable, as are copolyolefins from more than two components such as ethylene/α-olefin/acrylic acid ester copolymers (particularly ethyl or butyl esters thereof). These copolyolefins can also be further grafted, for example with maleic acid anhydride.

The process according to the invention for the production of useful articles from lactam/amino acid polyamide differs from the prior art, e.g. in that a network with two types of branching points is formed in the final product. On the one hand, the original branch points already present in the polyamide starting material due to the polyfunctional components effecting branching and, on the other hand, the network points formed by the process of silane crosslinking beyond the chain ends, are present. The number of chain ends which become part of the network obviously depends on the equivalent content of silane, relative to the reactive chain ends of the polyamide. This depends on the degree of branching, the molecular weight, and the proportion of chain ends which carry crosslinking active centers, e.g. the concentration of —NHR and —NH$_2$ groups when crosslinking with epoxide silane.

A further advantage of the process according to the invention is that a large number of thermally stable crosslinking points can be obtained and important properties such as the yield strength, creep under load and heat, swelling due to solvents, and resistance to dripping of molten polymer under the action of heat and fire, can be improved.

The polyamide shaped articles produced by the process according to the invention can be modified in many ways; for example, by incorporating reinforcing materials such as glass fibers or mineral fillers; dyes; plasticizers; polymer components; and stabilizers against disadvantageous effects of heat, light, oxidation, and discoloration; and pigments such as carbon black. These additives should not enter into undesirable secondary reactions or substantially impair the crosslinking reaction.

The invention will now be illustrated in greater detail by examples.

The polyamide starting materials used are:

| | |
|---|---|
| Laurolactam | LL |
| Aminolauric acid | ALS |
| Caprolactam | CL |

Further components of the polymerization formulations are:

| | |
|---|---|
| Trimesic acid | TMS |
| Nitrilotriethaneamine | N-TEA |
| Azelaic acid | AZ |
| Adipic acid | ADIP |
| Diaminohexane | HMD |
| 3-Amino-1-cyclohexylaminopropane | ACAP |

The last is an example of an amine with a condensation-active and a sterically hindered amino group.

PRODUCTION OF THE POLYAMIDES

The polyamides A–K used in the following tests were produced on an industrial scale by a batch process. The reactants were charged into a steel autoclave, heated by heat carrying oil, and subjected to excess pressure. The polycondensation was carried out in known manner under a blanket of nitrogen and steam. The production of polyamide from amino acids and lactams is a process well known to the ordinarily skilled person. The polymerization formulations (basic monomers and branching components) are compiled in Table 1, which also contains the polymerization conditions and the analytically determined concentration of amine functional groups, which are mainly group —NHR.

The polyamides according to Table 1 were injection molded to form test pieces according to DIN 53 453 and DIN 53 455. The masterbatch process described in U.S. Pat. No. 4,783,511 was used. A particularly preferred method of carrying out this process was selected; namely microporous polyamide was used as the masterbatch carrier for the silane whereby, in each example, 30% by weight of this carrier was charged with 70% by weight of silane.

The examples, among other things, relate to a comparison between linear polyamide chain molecules and variously branched polyamide chain molecules and evidence the influence of the chain structure on the behavior of the polyamides. Thus, the same reactive centers (—NHR), the same silane with a reactive epoxide group, the same masterbatch carrier (microporous PA-12 loaded with 2.33 times its weight of silane), and the same injection molding process were used in each case.

The polymers A–K described in Table 1 were used for Examples 1 to 28, the comparison tests being identified by V in each case. The results of DIN 53 455 tests are also shown in the correspondingly numbered tension elongation graphs. The silane used has three condensing methoxy groups in addition to the polyamide-reactive group. A three-dimensional network having the following structure is formed during condensation thereof when using linear polyamides:

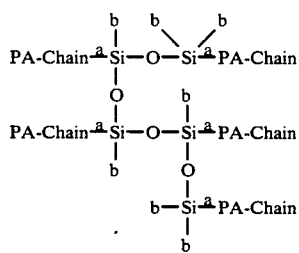

In this diagram, a represents the silane radical which carries the epoxy groups and is added at the polyamide chain, and b represents the methoxy group and the OH group hydrolyzed from OCH$_3$. It should be noted that these groups can continue condensing with themselves so that the network becomes denser than shown.

If the mechanical values, in particular the tension elongation performance, were to relate directly to the density of this network and increase with an increase thereof, then linear short —NHR-terminated polyamide chains would exhibit the best mechanical behavior when stoichiometric 1:1 silane crosslinking is carried out. In other words, they should process the highest tension stress in deformation curves. In V3 and V4, linear PA chain molecules are silane crosslinked. Although the polyamide in V4 has shorter polyamide molecules and more reactive centers than V3, it gives poorer tensile values.

Surprisingly, it has now been found that, when using branched-chain thermoplastically processible polyamides with sites capable of reacting with silane, it is possible to obtain markedly superior mechanical values. Both the toughness and the strength are clearly improved. This is surprising and unexpected inasmuch as the conventional methods of increasing toughness have a detrimental effect on the strength and rigidity of polyamide. The trend of the stress-strain diagrams according to the invention shows, however, that the tensile strength of branched chain polyamide is increased by silane crosslinking without reduction in toughness. The more branch points in the polyamide, the greater the increase in strength when polyamides of comparable molecular weight are used and crosslinked.

In addition to the properties mentioned in the tables, the dimensional stability above the normal melting point of polyamide described in U.S. Pat. No. 4,647,630 is also achieved if sufficient silane is used to build up a continuous three dimensional network. In the anti-flame (AF) test of column 8, 3.2 mm thick rods were exposed to an open flame in accordance with Underwriters Laboratories (Melville, USA) test UL 94. The average flame treatment time (two measurements) until droplet formation occurs is given. The results show that, when using shaped articles of polyamide according to the invention, it takes substantially longer for polyamide composition to flow away freely under the influence of fire and this period increases with increasing branch density.

To assess the invention, it should be assumed that a dense network is generally formed with conventional silane crosslinking of linear chains. If silane crosslinking takes place at the chain ends, the network becomes denser as the polyamide chains having reactive centers grow shorter. If the silanes which are normal in the industry with groups capable of reacting with PA chain ends and three condensing —OR functional groups are used, then the exemplified structure is formed and produces a dense network, provided that stoichiometric amounts (one silane per reactive site) of silane and short polyamide chains are used. However, as the network gets denser, the mechanical properties become substantially poorer when shorter chain polyamide starting materials are used. It is surprisingly possible to produce shaped articles having very markedly improved properties such as strength, toughness, dimensional stability under the action of heat, reduced dropping off by flaming, and reduced creep under load only by using branched polyamides which produce structures having the two types of network points.

In Table 2, the numerals have the following meanings:

V = comparison tests
1 = γ-glycidoxypropyltrimethoxysilane
2 = equivalent % of silane based on the reactive centers
3 = the notched bar impact strength according to DIN 53 453 wherein tro = dry, ko = conditioned, and KB = no break
4, 5, 6 and 7 = the tensile values according to DIN 53 455 wherein
    4 = tensile strength at yield 5 = elongation at yield
6 = tensile strength at break
7 = elongation at break
8 = flame test according to UL 94: time until droplet formation starts, in seconds

BRIEF DESCRIPTION OF THE DRAWINGS

In the accompanying drawings,

FIGS. 3–20 are tension-elongation graphs.

FIGS. 1 and 2 show creep behavior under constant load measured at (80° C.) in terms of the elongation with reference to time. Two curves were measured per variant in each case.

FIG. 1 shows the time elongation curves (ZDL) a) and b) corresponding to the uncrosslinked polymer A, ZDL c) and d) corresponding to the 100% crosslinked polymer A, ZDL e) and f) corresponding to an uncrosslinked singly branched polyamide-12 with 85 μeq/g amine functional groups (polymer L), and ZDL g) and h) corresponding to the 100% crosslinked polymer L.

FIG. 2 shows the time elongation curves of a type M polyamide-12 with three chain branches and 170 μeq/g amine functional groups. ZDL j) and k) correspond to the uncrosslinked starting polyamide, lines l) and m) correspond to the 100% crosslinked polyamide M.

Polyamide L is produced in a similar manner to polyamide C and polyamide M is produced in a similar manner to polyamide G, and they each have the corresponding basic structure. FIG. 1 also shows the time elongation curve corresponding to the comparison material V1, but measured at 20° C. In the creep curves, the elongation scales were adapted to the measured elongation.

Figure 1:
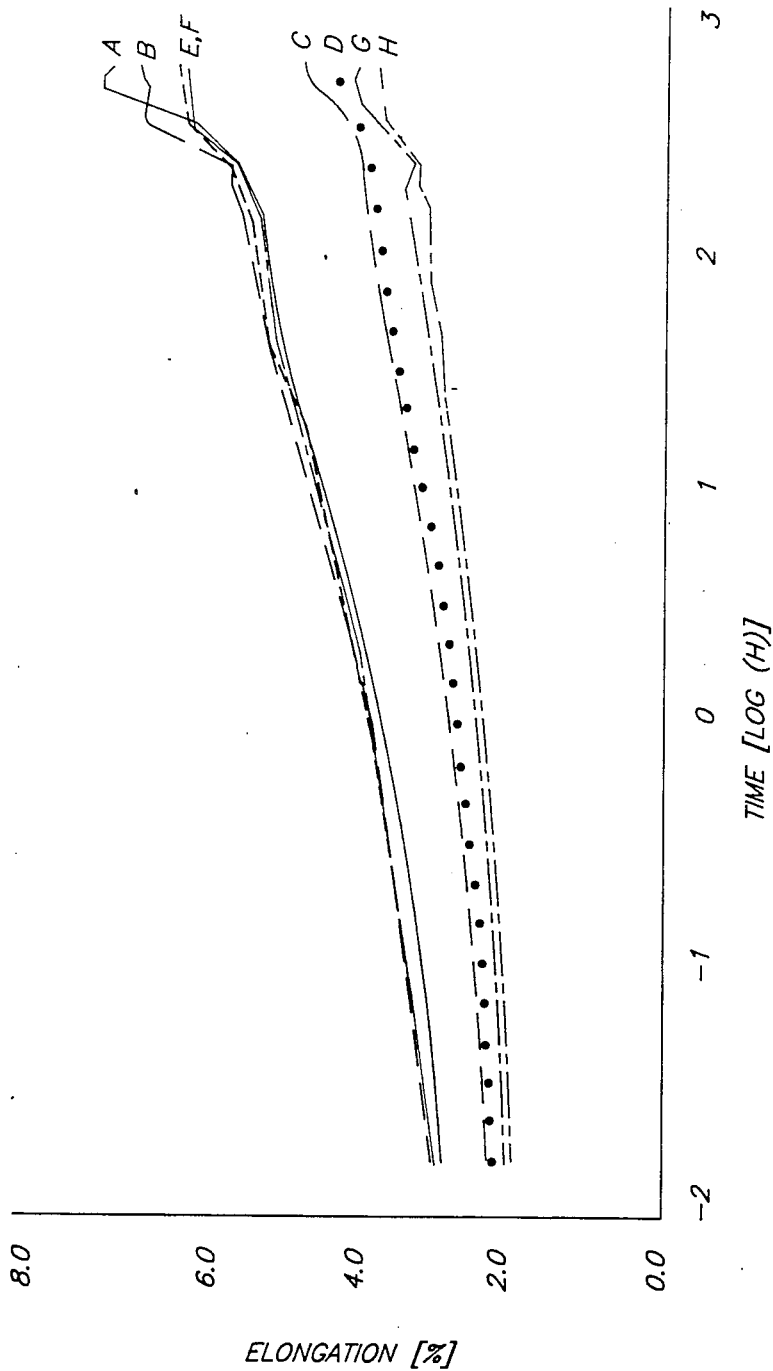
FIGS. 1 and 2 are graphs showing the relationship of elongation to time of various polymers.
Figure 2:
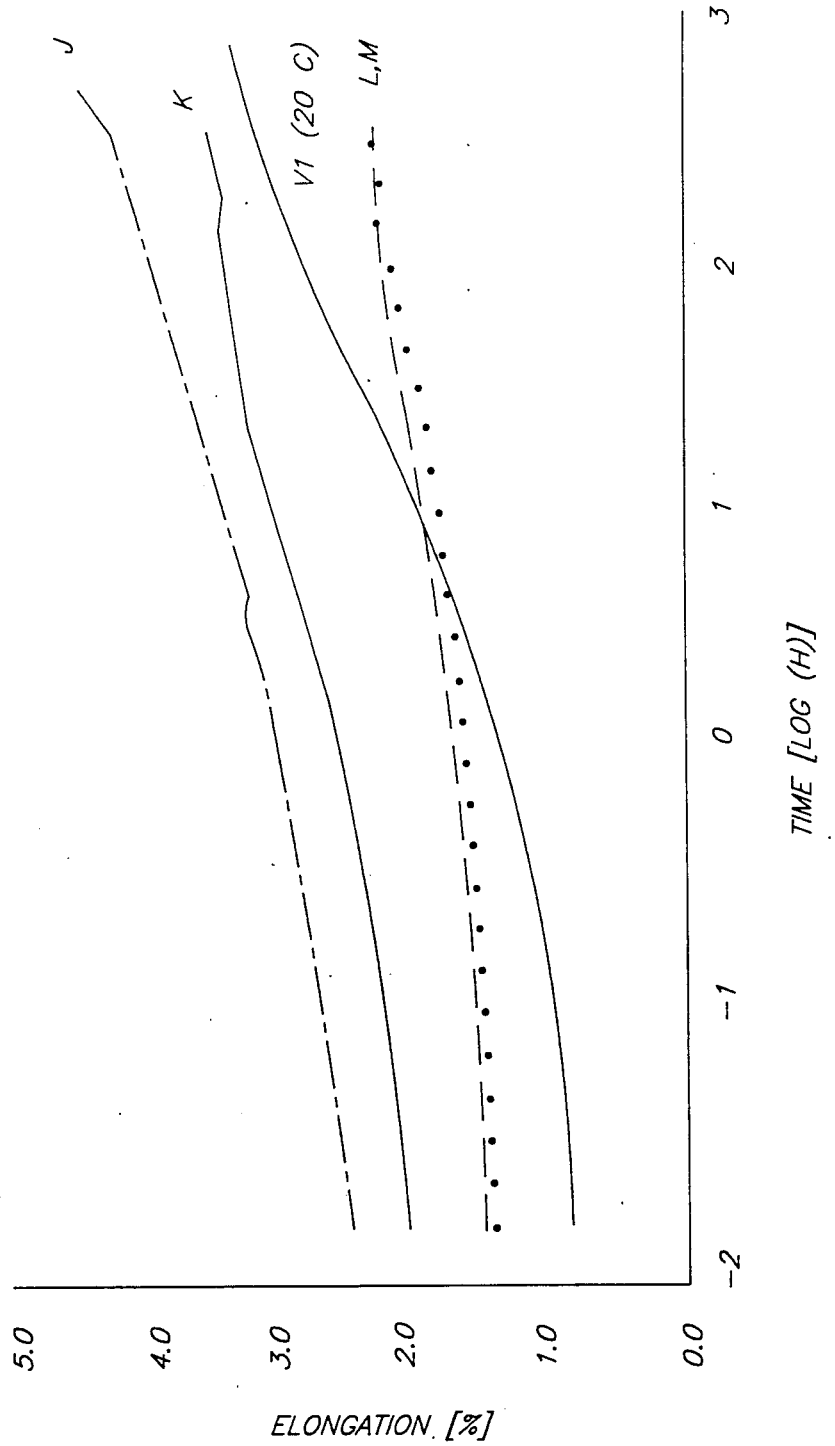
Figure 15:
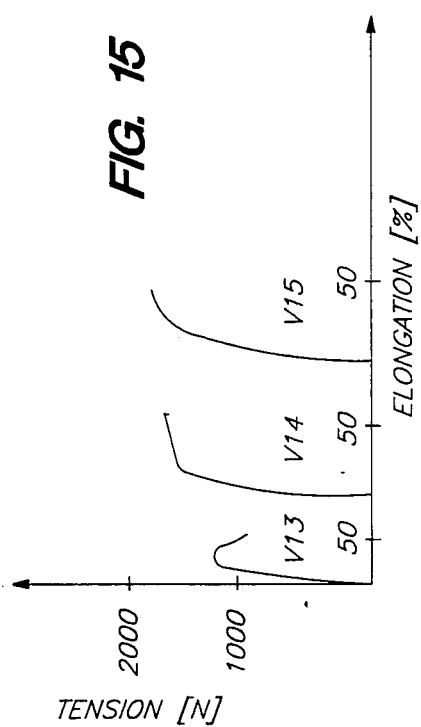
Figure 16:
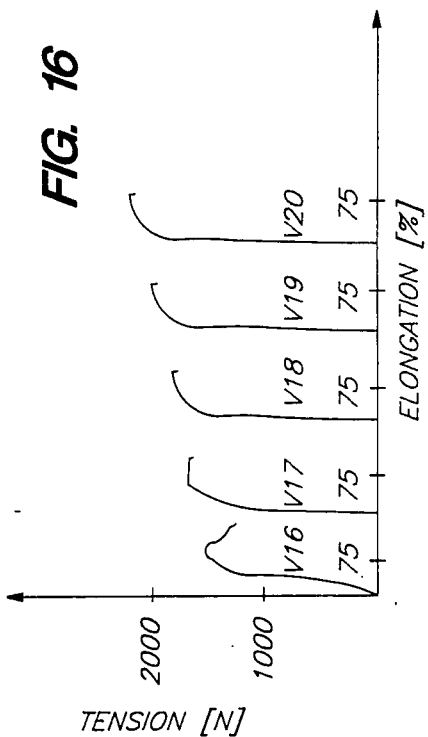
Figure 11:
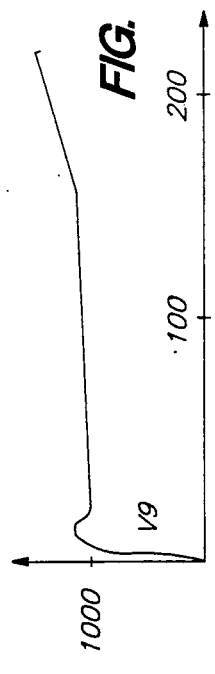
Figure 12:
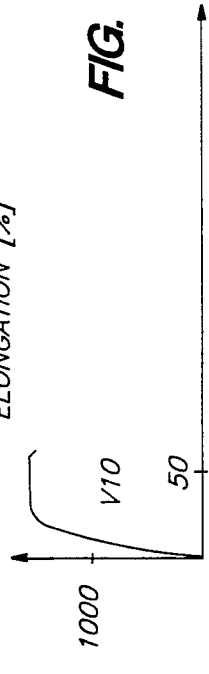
Figure 13:
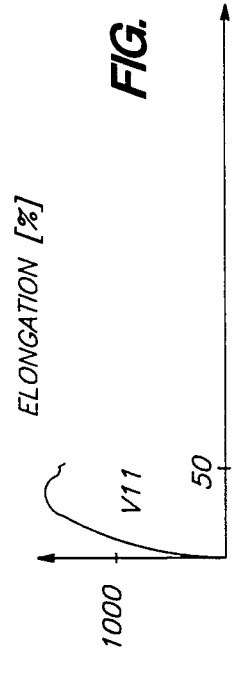
Figure 14:
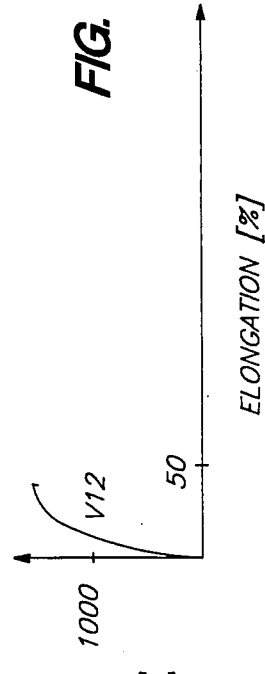
Figure 19:
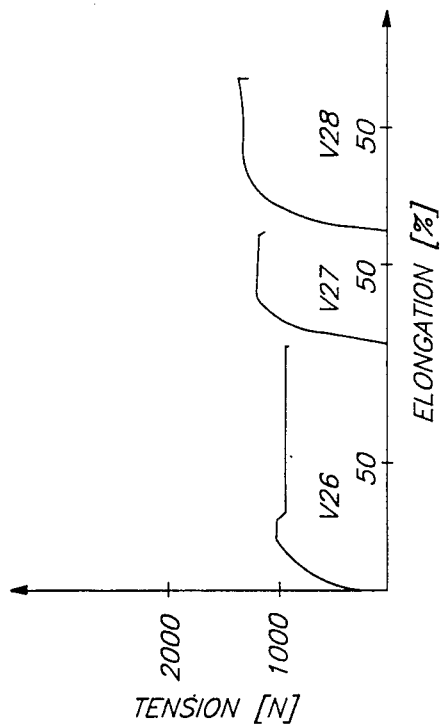
Figure 20:
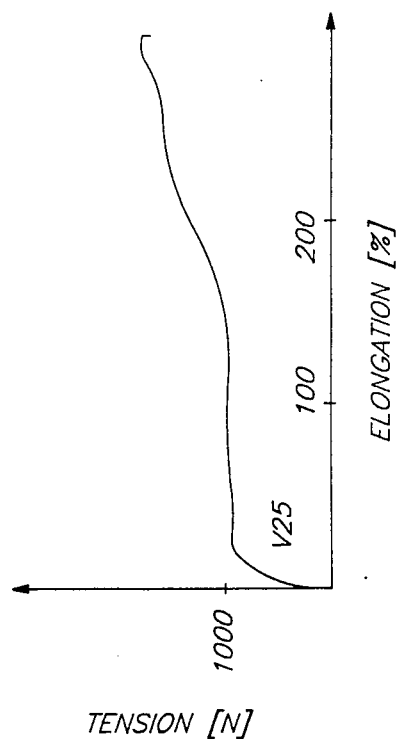
Figure 17:
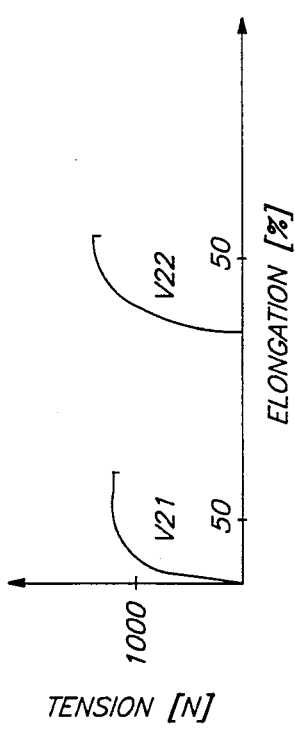
Figure 18:
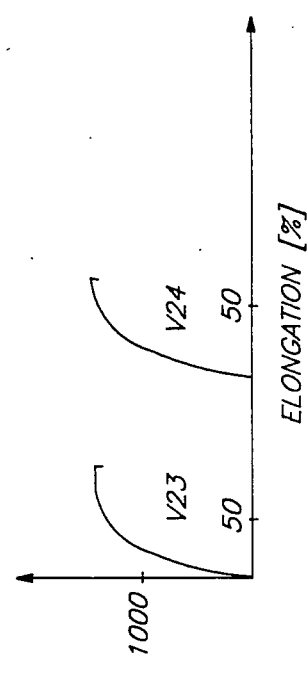

The curves show that the elongation is reduced very markedly by the crosslinked structure and is smaller, the more prebranched the starting polyamide is. Comparison with V1 shows the very great improvement. After ten hours loading time, the crosslinked polymer M creeps at 80° C. only as much as the uncrosslinked standard injection molding material at 20° C. After longer loading times, the elongation of polymer M, crosslinked at 80° C., is progressively lower than that of the standard injection molding material at room temperature. The eminent suitability of the process according to the invention for the production of high quality constructional elements is thus demonstrated impressively.

TABLE 1

| Test No | Polyamide starting material | Amount Kg | Structure regulator [mMol/kg Polymer] | | | | | Observations |
|---|---|---|---|---|---|---|---|---|
| | | | TMS | N-TEA | AZ | ADIP | HMD | ACAP | |
| A | LL | 400.0 | — | — | 28.0 | — | | 58.0 | linear Polymer chain |
| B | LL | 45.0 | — | — | 28.5 | | | 60.0 | linear Polymer chain |
| C | LL | 42.0 | 25.0 | | | | | 80.0 | 1 branching |
| D | ALS | 8.0 | 30.0 | | | | | 92.0 | 1 branching |
| E | " | 8.0 | 60.0 | | | | 30.0 | 120.0 | 2 branching |
| F | " | 8.0 | 90.0 | 30.0 | | | | 180.0 | 4 branching |
| G | " | 8.0 | 60.0 | 30.0 | | 60.0 | | 170.0 | 3 branchings + linear part |
| H | " | 8.0 | 60.0 | 30.0 | | 60.0 | | 170.0 | 3 branchings + linear part |
| J | CL | 40.0 | 100.0 | 30.0 | | | | 210.0 | advant. 4 branchings |
| K | CL | 42.0 | 56.0 | 28.0 | | 46.0 | | 176.0 | 3 branchings + linear part |

| | Polymerisations conditions | | | | | Polymer analysis | | | | |
|---|---|---|---|---|---|---|---|---|---|---|
| | Pressure phase | | | Degasing | | Viscosity | Melt viscosity | | | End groups (μeq/g) |
| Test No | Temp [°C.] | Time [h] | Pressure [atü] | Temp. [°C.] | Time [h] | ηrel 0.5% Meta-cresol | Temp. [°C.] | load [N] | V Pa.s | —NHR | —COOH |
| A | 290.0 | 6.0 | 20.0 | 280 | *3 | 2.08 | 270.0 | 122.6 | 320.0 | 40 | 6 |
| B | 290.0 | 6.0 | 20.0 | 280 | 4 | 1.81 | | | — | 65 | 19 |
| C | 295.0 | 7.0 | 20.0 | 280 | 6 | 1.78 | | | | 83 | 24 |
| D | 220.0 | 1.0 | 5.0 | 220–240 | 6 | 1.70 | 220.0 | " | 265.0 | 122 | 22 |
| E | 220.0 | 1.0 | 5.0 | " | 8 | 1.72 | " | " | 390.0 | 135 | 22 |
| F | 220.0 | 1.0 | 5.0 | " | 8 | 1.92 | " | | 380.0 | 190 | 14 |
| G | 220.0 | 1.0 | 5.0 | 220–250 | 6 | 1.76 | 260.0 | " | 33.0 | 170 | 22 |
| H | 220.0 | 1.0 | 5.0 | " | 6 | 1.89 | " | " | 390.0 | 160 | 27 |
| J | 265.0 | 2.0 | 10.0 | 265 | 7 | 1.88 | | | | 180 | 26 |
| K | 240.0 | 3.0 | 10.0 | 240–260 | 8 | 1.51 | | | | 200 | 30 |

1 h at 100 torr

TABLE 2

| Test No | Polyamide Type | Product | Branching | Reactive Centres μE/g | Silane 1 μMol/g | Silane 2 % | KSZ 3 dry | STSP 4 | SID 5 % | REF 6 | RED 7 % | AF-Test 8 (sec) |
|---|---|---|---|---|---|---|---|---|---|---|---|---|
| V1 | 12.0 | Stand. | — | — | — | — | 6 | 10 | 33.0 | 20 | 50 | 300 | 4.0 |
| V2 | " | A | — | 40.0 | — | — | 9 | 16 | 39.0 | 28 | 44 | 150 | 4.0 |
| V3 | " | A | — | 40.0 | 32.0 | 80.0 | 10 | 36 | 43.0 | 34 | 46 | 130 | 6.0 |
| V4 | " | B | — | 65.0 | 60.0 | 92.0 | — | KB | 33.0 | 20 | 40 | 180 | —(?) |
| V5 | " | C | 1 | 83.0 | — | — | 4 | 6 | 41.0 | 34 | 38 | 80 | 3.0 |
| 6 | " | C | " | 83.0 | 66.0 | 80.0 | 10 | 37 | 47.0 | 33 | 48 | 100 | 10.0 |
| V7 | " | D | " | 122.0 | — | — | 5 | 4 | 36.0 | 20 | 54 | 300 | 2.0 |
| 8 | " | D | " | 122.0 | 98.0 | 80.0 | 10 | 19 | 42.0 | 30 | 50 | 150 | 7.0 |
| V9 | " | E | 2 | 135.0 | — | — | 4 | 4 | 38.0 | 20 | 41 | 230 | 2.0 |
| 10 | " | E | " | 135.0 | 108.0 | 80.0 | 11 | 46 | 49.0 | 30 | 50 | 80 | 13.0 |
| V11 | " | F | 4 | 190.0 | — | — | 4 | 5 | 49.0 | 30 | 48 | 50 | 6.0 |
| 12 | " | F | " | 190.0 | 175.0 | 92.0 | 21 | 40 | — | — | 60 | 50 | 20.0 |
| V13 | " | G | 3 | 170.0 | — | — | 4 | 4 | 44.0 | 30 | 37 | 50 | . |

TABLE 2-continued

| Test No | Polyamide Type | Product | Branching | Reactive Centres µE/g | Silane 1 µMol/g | Silane 2 % | KSZ 3 dry | | STSP 4 | SID 5 % | REF 6 | RED 7 % | AF-Test 8 (sec) |
|---|---|---|---|---|---|---|---|---|---|---|---|---|---|
| 14 | " | G | " | 170.0 | 140.0 | 84.0 | 20 | 55 | — | — | 61 | 70 | |
| 15 | " | G | " | 17.0 | 200.0 | 118.0 | 44 | KB | — | — | 64 | 60 | |
| V16 | " | H | " | 160.0 | — | — | | | | | | 30 | |
| 17 | " | H | " | 160.0 | 40.0 | 25.0 | | | | | | 30 | |
| 18 | " | H | " | 160.0 | 80.0 | 50.0 | | | | | | 30 | |
| 19 | " | H | " | 160.0 | 120.0 | 75.0 | | | | | | 30 | |
| 20 | " | H | " | 160.0 | 160.0 | 100.0 | | | | | | 30 | |
| V21 | 6 | J | 4 | 180.0 | — | — | | | | | 37 | | |
| 22 | " | J | " | 180.0 | 54.0 | 30.0 | | | | | 41 | | |
| 23 | " | J | " | 180.0 | 90.0 | 50.0 | | | | | 45 | | |
| 24 | " | J | " | 180.0 | 144.0 | 80.0 | | | | | 46 | | |
| V25 | " | Stand. | " | 180.0 | — | — | | | 30.0 | 20 | 57 | | |
| V26 | " | K | 3 | 200.0 | — | — | 1.4 | KB | 31.0 | 30 | 29 | 100 | |
| 27 | " | K | " | 200.0 | 100.0 | 50.0 | 1.4 | KB | 37.0 | 35 | 37 | 65 | |
| 28 | " | K | " | 200.0 | 180.0 | 90.0 | 1.5 | KB | — | — | 43 | 65 | |

What is claimed is:

1. A process for the preparation of crosslinked shapes from a polymer, said process comprising reacting at least one starting polyamide containing at least 30% by weight of branched polymer chains having chain ends with a silane of the formula

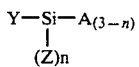

wherein n is 0, 1, or 2, Z is an inert organic radical, A is a radical capable of hydrolyzation in the presence of moisture, and Y is a divalent organic radical having at least one functional group capable of reacting with amino groups, carboxyl groups, or amide groups to form a body in the substantial absence of water, forming said body into desired shapes, and contacting said shapes with water.

2. The process of claim 1 wherein the reaction takes place in a melt.

3. The process of claim 1 wherein said amino groups are of the formula —NH$_2$ or —NHR, R being selected from the group consisting of alkyl, aryl, cyclohexyl and aralkyl.

4. The process of claim 3 wherein R has a maximum of 12 carbon atoms.

5. The process of claim 1 wherein said starting polyamide is a reaction product of hydrolytic polymerization of basic monomers comprising lactams, amino carboxylic acids, or mixtures thereof.

6. The process of claim 5 wherein said lactams and/or amino carboxylic acids have 6 to 12 carbon atoms.

7. The process of claim 5 wherein said lactams and/or amino carboxylic acids are selected from the group consisting of 12-aminolauric acid, caprolactam, enantholactam, laurolactam, p-amino methyl benzoic acid, and mixtures thereof.

8. The process of claim 5 wherein branching components are additionally present whereby said basic monomers are converted into said starting polyamides.

9. The process of claim 8 wherein said branching component is trimesic acid or nitrilotriethane amine.

10. The process of claim 8 wherein there are a plurality of said branching components having a plurality of carboxyl groups and a plurality of primary amino groups, whereby multiply branched chains are produced.

11. The process of claim 8 wherein said branching components comprise (1) 5 to 150 µmol/g based on said polymer of an at least trifunctional amine or carboxylic acid, (2) 2 to 100 µmol/g based on said polymer of an at least bifunctional carboxylic acid or amine, provided that, when (1) is said acid, (2) is said amine, and when (1) is said amine, (2) is said acid, and optionally (3) 5 to 450 µmol/g based on said polymer of a monomer which acts monofunctionally during polycondensation.

12. The process of claim 11 wherein (1) further contains a bifunctional monomer.

13. The process of claim 11 wherein (3) carries a sterically hindered —NHR group, wherein R is alkyl, aryl, cyclohexyl, or aralkyl.

14. The process of claim 13 wherein said silane is an epoxide silane and said —NHR groups comprise at least 60% of all terminal amino groups in said polymer.

15. The process of claim 14 wherein said —NHR groups comprise 70% to 95% of said terminal amino groups.

16. The process of claim 3 wherein said silane is present in an equivalent ratio of said silane to said —NHR and —NH$_2$ groups of 0.3 to 1.2.

17. The process of claim 1 wherein Z contains 1 to 12 carbon atoms.

18. The process of claim 17 wherein Z is alkyl, aryl having 6 to 10 carbon atoms, or cycloalkyl.

19. The process of claim 1 wherein Y carries as said functional group, epoxy, isocyanate, acid anhydride, amino, or carboxylic acid esters of aromatic alcohols, which alcohols have 2 to 15 carbon atoms.

20. The process of claim 1 wherein Y is a straight or branched chain having 1 to 6 carbon atoms.

21. The process of claim 20 wherein Y contains at least one ether oxygen.

22. The process of claim 1 wherein A is —OR, in which R is aliphatic, araliphatic, cycloaliphatic, cycloaraliphatic, or aliphatic containing ether oxygen.

23. The process of claim 22 wherein the aliphatic has 1 to 4 carbon atoms.

24. The process of claim 23 wherein R is methyl, ethyl, and/or 2-methoxyethyl.

25. The process of claim 1 wherein said functional group is capable of reacting with —NH$_2$ or —NHR$_x$ groups, R being alkyl, aryl, cyclohexyl, or aralkyl.

26. The process of claim 2 wherein said silane is continuously introduced into said melt.

27. The process of claim 1 wherein said silane is absorbed into a carrier to form a masterbatch in the absence of water.

28. The process of claim 27 wherein said carrier is selected from the group consisting of microporous polyamides, polymers having a series of double bonds, and crosslinked butadiene-containing polymers.

29. The process of claim 28 wherein said carrier is selected from the group consisting of polybutadienes and microporous polyamide 12.

30. The process of claim 29 wherein said carrier is selected from the group consisting of diblock polymers, triblock polymers, and crosslinked butadiene containing polymers.

31. The process of claim 30 wherein said butadiene containing polymers are of the core/shell type.

32. The process of claim 27 wherein said carrier is a copolyolefin.

33. The process of claim 32 wherein said copolyolefin is of low crystallinity.

34. The process of claim 32 wherein said copolyolefin is ethylene/propylene, ethylene/α-olefin, ethylene/acrylic acid ester, or ethylene/α-olefin/acrylic acid ester.

35. The process of claim 34 wherein said ethylene/α-olefin is a polymer of ethylene with butene, hexene, or octene.

36. The process of claim 34 wherein said acrylic acid ester is an ethyl or butyl ester.

37. The process of claim 32 wherein said copolyolefin is grafted with maleic anhydride.

38. The process of claim 1 wherein there are original branch points contained in said starting polyamide and network points formed by silane crosslinking at said chain ends.

39. The process of claim 5 wherein said amino carboxylic acids are ω-amino carboxylic acids.

40. The process of claim 1 wherein said starting polyamide contains at least 40% by weight of polymer chains having at least one branch.

41. The process of claim 40 wherein said starting polyamide contains 50% to 95% by weight of polymer chains having at least one branch.

42. The process of claim 1 wherein said starting polyamide comprises 5% to 70% by weight of linear chains.

43. The process of claim 1 wherein said starting polyamide comprises 5% to 50% by weight of linear chains.

44. The process of claim 3 wherein said starting polyamide has terminal groups which are $-NH_2$, $-NHR$, and COOH.

45. The process of claim 44 wherein said terminal groups are mainly $-NHR$.

46. The process of claim 1 wherein said starting polyamide contains 30 to 300 μeq/g of amino groups.

47. The process of claim 22 wherein R has 1 to 12 carbon atoms.

* * * * *